(12) United States Patent
Beunings et al.

(10) Patent No.: US 7,743,386 B2
(45) Date of Patent: Jun. 22, 2010

(54) CONTEXT OBJECTS FOR ACCESSING MESSAGE CONTENT

(75) Inventors: Frank Beunings, Wiesloch (DE); Thea Hillenbrand, Rauenberg (DE); Uwe Schlarb, Oestringen (DE)

(73) Assignee: SAP AG, Walldorf (DE)

( * ) Notice: Subject to any disclaimer, the term of this patent is extended or adjusted under 35 U.S.C. 154(b) by 1421 days.

(21) Appl. No.: 10/799,363

(22) Filed: Mar. 12, 2004

(65) Prior Publication Data

US 2005/0204359 A1      Sep. 15, 2005

(51) Int. Cl.
G06F 9/44 (2006.01)
G06F 17/00 (2006.01)

(52) U.S. Cl. .................... 719/315; 719/328; 707/10

(58) Field of Classification Search ............... 705/1–11, 705/26, 27; 709/201–207, 217–219; 715/513, 715/733, 734, 737, 738, 740, 749, 760; 719/313–315, 719/201, 217, 328; 707/10
See application file for complete search history.

(56) References Cited

U.S. PATENT DOCUMENTS

| | | | |
|---|---|---|---|
| 6,779,184 B1 * | 8/2004 | Puri et al. ................... | 719/315 |
| 7,143,186 B2 * | 11/2006 | Stewart et al. .............. | 709/245 |
| 7,269,627 B2 * | 9/2007 | Knauerhase ................ | 709/206 |
| 2003/0053459 A1 * | 3/2003 | Brouk et al. ................ | 370/392 |
| 2003/0061256 A1 * | 3/2003 | Mathews et al. ............ | 709/101 |
| 2003/0212818 A1 * | 11/2003 | Klein et al. ................. | 709/238 |
| 2003/0217176 A1 * | 11/2003 | Beunings .................... | 709/238 |
| 2004/0068728 A1 * | 4/2004 | Blevins ....................... | 718/100 |
| 2004/0193687 A1 * | 9/2004 | Christensen et al. ........ | 709/206 |
| 2005/0138634 A1 * | 6/2005 | Luty et al. ................... | 719/315 |
| 2005/0182843 A1 * | 8/2005 | Reistad et al. .............. | 709/230 |

FOREIGN PATENT DOCUMENTS

| | | |
|---|---|---|
| EP | 1513302 | 3/2005 |
| WO | 03/036887 | 5/2003 |
| WO | 2004/102438 | 11/2004 |

OTHER PUBLICATIONS

Epping, Magnus, "New Features of the Integration Builder" Jan. 7, 2004, SAP AG Internet.

* cited by examiner

*Primary Examiner*—Hyung S Sough
*Assistant Examiner*—Charles E Anya
(74) *Attorney, Agent, or Firm*—Mintz, Levin, Cohn, Ferris, Glovsky and Popeo, P.C.

(57) ABSTRACT

To improve access to message content in a message exchange system, a context object is defined for the message as an abstraction of the message content. The context object can be assigned to many different message communication interfaces, thereby allowing context objects to be reused across various interfaces. The context object provides access both to a message payload, and parts of a message other than the payload, such as technical data. Accordingly, access to message content for various tasks and applicability to a number of different message interfaces is improved.

11 Claims, 4 Drawing Sheets

```
<ns1:SalesOrder xmlns:ns1=„http://sap.com/xi/CRM">
    <HeaderData>
        <SalesOrganization>01</SalesOrganization>
        <ShipTo>Meier</ShipTo>
    </HeaderData>
    </Item>
                                                    272
        <Material>123</Material>
        <Plant>0001</Plant>
        <Amount>20</Plant>
    </Item>
    </Item>
                                                    274
        <Material>ABC</Material>
        <Plant>0002</Plant>
        <Amount>10</Plant>
    </Item>
</ns1:SalesOrder>
```

CONTEXT OBJECTS FOR ACCESSING MESSAGE CONTENT

BACKGROUND

A collaborative computing environment employs some form of communication between computing systems, such as a messaging system for message exchange. In such systems, messages can take virtually any form, such as extensible markup language (XML) format, and can include any type of various content, such as a document, file, list, etc. Messaging systems typically use some form of routing scheme to guide messages from a sender to one or more intended recipients. Routing is conventionally directed by header information appended to the content of the message at or near the sender.

Increasingly, however, access to the content or "payload" of a message is often needed. For instance, business applications in a heterogeneous computing environment can communicate with each other through a message exchange infrastructure, such as provided by SAP of Walldorf, Germany. The exchange infrastructure and/or the applications may need to access the content of a request message from one application to another in order to fulfill their tasks. Several examples of these tasks include message routing and business process management. For example, a routing rule may be established, such as: "When Plant '01' is present in a message, then the receiver system is 'X'." In another example, a business process may require of an application, based on a message content: "When Sales Organization is '01' then wait for a confirmation."

Access to message content data is traditionally done via Xpath expressions, however such access is sometimes very cumbersome and typically very technical. An easier message content access technique is needed, and that can be employed across different interfaces.

SUMMARY

To improve access to message content in a message exchange system, a context object is defined for the message as an abstraction of the message content. The context object can be assigned to many different message communication interfaces, thereby allowing context objects to be reused across various interfaces. The context object provides access both to a message payload, and parts of a message other than the payload, such as technical data. Thus, access to message content for various tasks is improved, and applicability to a number of different message interfaces is enhanced.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

FIG. 2 is an example message including context objects.

Like reference symbols in the various drawings indicate like elements.

DETAILED DESCRIPTION

Systems and methods for improved access to message content in a message exchange system include a context object defined for message content. The context object is an abstraction of the message content, configurable by a user and preferably expressed as a string. These systems and methods further include the context object assigned to any interface for describing the message. Accordingly, context objects can be assigned to different interfaces, and can be reused across the different interfaces.

Figure 1A:
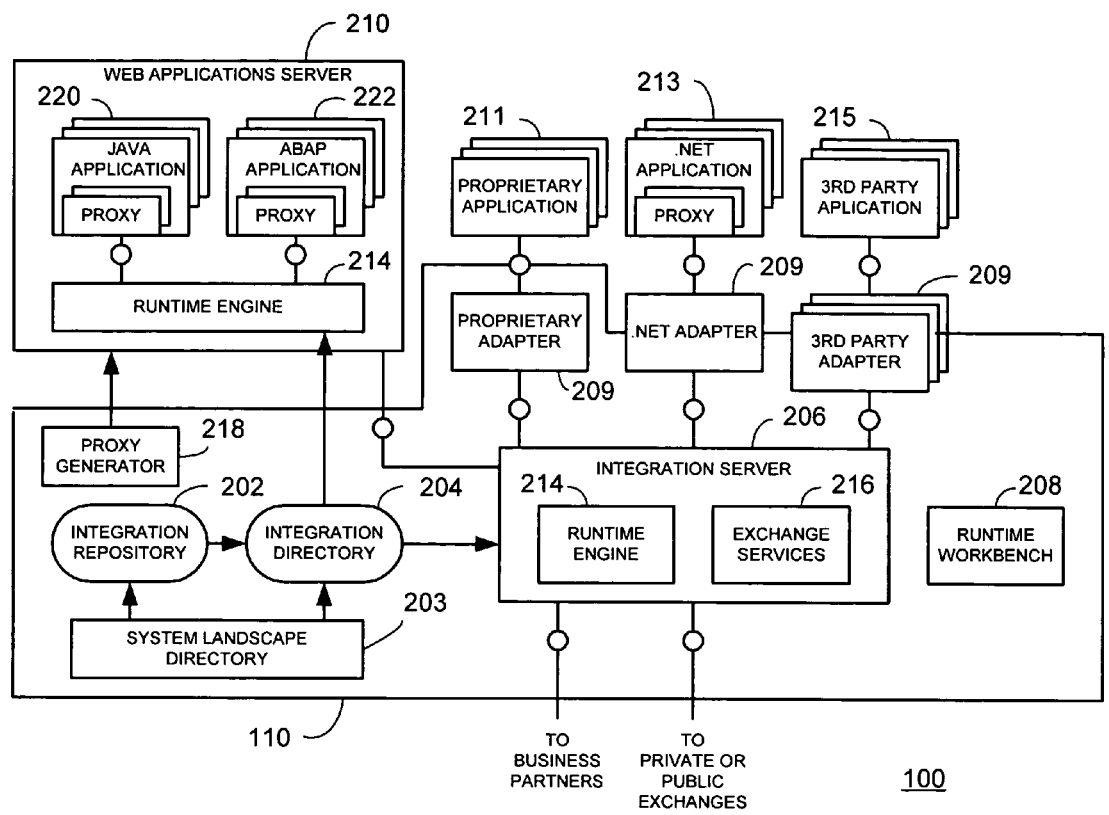
FIG. 1A is a block diagram of a computing environment suitably adapted for context objects.

FIG. 1A is a block diagram of a computing environment 100 in which the use of context objects is suitably adapted. The computing environment 100 includes an exchange infrastructure (XI) 110. The XI 110 includes various adapters 209 configured to provide connectivity between the integration server 206 and proprietary applications 211, Web-based services 213, and third party applications 215. The XI 110 also can include a Web Application Server 210 providing Web-based applications. The Web Application Server 210 also includes a runtime engine 214 for messaging and business process control between Web-based applications such as Java applications 220, ABAP applications 222, and/or other software components.

A proxy generator 218 can generate interface proxies on demand for any application based on information stored on the integration repository 202. Web-based communication logic can be implemented based on the proxy that represents the interface description of the respective development platform, such as Java, ABAP, and .NET for the web-based applications 213. The proxies convert platform-specific data types into XML on the outbound side and vice versa on the inbound side and provide access to the component-specific local runtime engine 214.

Figure 1B:
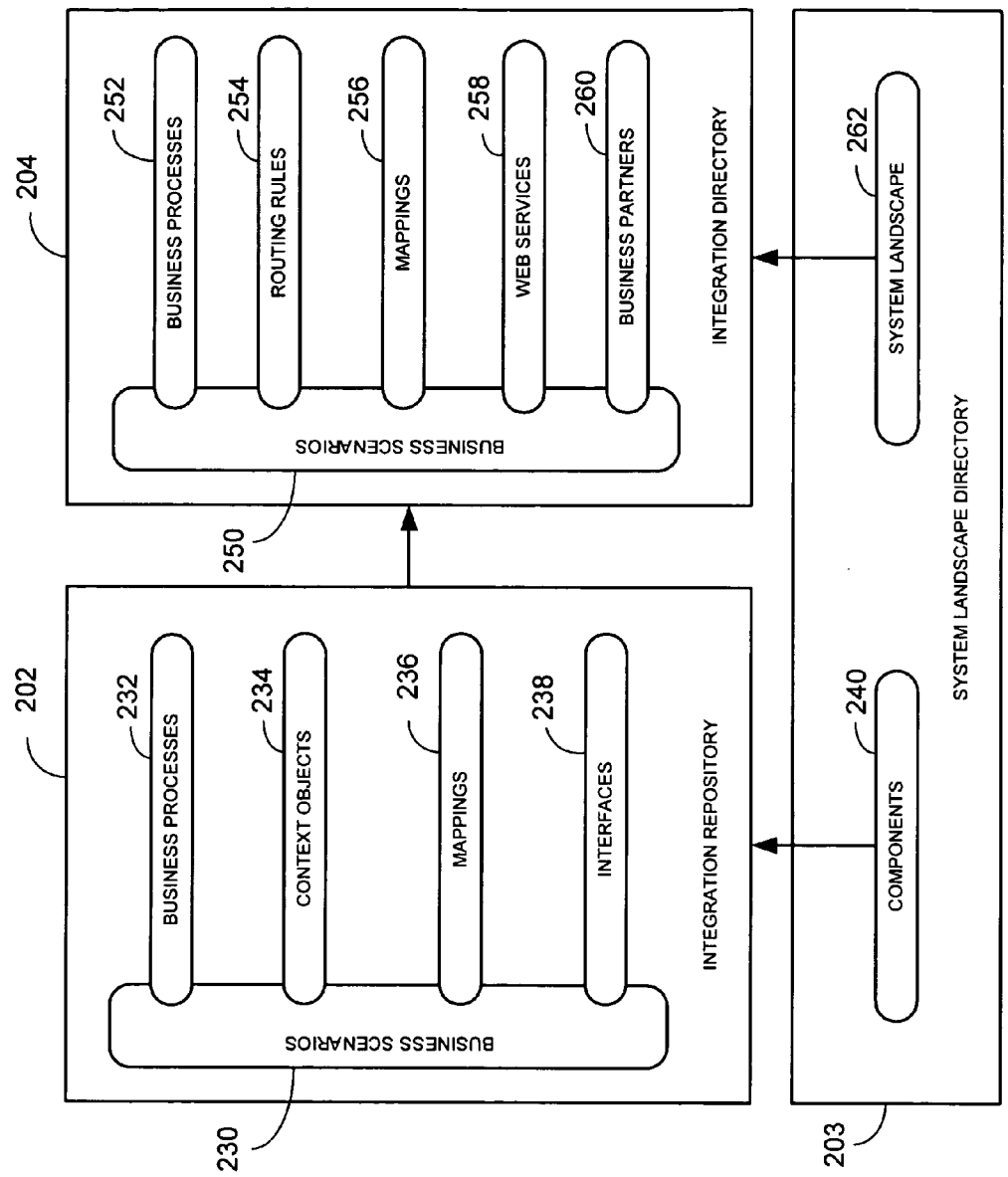
FIG. 1B is a block diagram of an integration repository and integration directory of an exchange infrastructure.

With reference also to FIG. 1B, the integration repository 202 includes descriptions of business processes 232, context objects 234, mappings 236, and interfaces 238, all of which are defined according to one or more business scenarios 230. The business processes 232 are extensible compound Web services executed using a business process engine (not shown). The context objects 234 for message content can be defined in the integration repository 202, also according to the business scenarios, which describe and configure message-based interaction between applications. Each of the context objects 234 has a name and an associated namespace. For example, in keeping with the examples above, a context object 234 can be "Plant" or "Sales Organization" associated with the namespace "http:/sap.com/xi/CRM."

Context objects 234 are predefined criteria to determine potential receivers of messages that must be distributed between software components and business partners during collaborative processing. Information about the context objects 234 are used in determining receiving application(s) prior to processing a complete message for distribution, and to be able to reuse certain criteria across different interfaces and provide a more abstract view on these interfaces. Mappings 236 define transformations between message interfaces 238, message types, or data types in the integration repository 202 that may be required.

The interface repository 202 also includes one or more interfaces 238 representing interface descriptions of all message interfaces of all software components in the environment. The interface repository 202 even provides interfaces that may potentially be used in a certain environment, whether or not actually used. Accordingly, the interfaces 238 can be implemented on any component using any technology. Message interfaces are made up of message types, which are in turn made up of data types. Interfaces 238 can be arranged according to any classification, such as inbound and outbound, or synchronous and asynchronous.

The integration directory 204 contains detailed collaboration knowledge that describes the configuration of each component as installed in the system. The integration directory 204 details information from the integration repository 202 that is specific to that configuration. The integration directory 204 includes descriptions of business scenarios 250, business processes 252, configured routing rules 254, and executable mappings 256. The integration directory 204 also includes descriptions of active Web services 258 and active business partners 260. The business scenarios 250 in the integration directory 204 represent the overall view of the interaction among interfaces and mappings 256 in the context of the actual configuration relevant for the specific implementation. The business processes 252 represents an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type, and the content of the message as defined by the content object 234 associated with the message.

Mappings 256 in the integration directory 204 represent mappings required in the runtime system landscape, in contrast to the integration repository mappings 236 that contains all supported mappings. Web services 258 describe implemented interfaces of the current system landscape, as well as active Web services supported by business partners. Business partners 262 defines usual information for business partners of a company such as names, addresses, and URLs, but may also contain more detailed and sophisticated information.

The integration repository 202 and integration directory 204 use software component descriptions stored in the system landscape directory 203. The system landscape directory 203 includes design-time descriptions of components 240 for the integration repository 202 and a configuration-specific collaboration description of a system landscape 262 at runtime for the integration directory 204. The components 240 represent component descriptions that include information about application components, as well as information relating to their dependencies on each other. The system landscape 262 describes the runtime system landscape actively using the XI 110.

FIG. 2 illustrates one type of message in which access to application data is available in the message payload. The message includes a first context object 272 (representing "Sales Organization") and two or more second context objects 274 (representing "Plant"). Context objects can also be defined for messages in which access to application data is not available in the payload, or which only provide access to technical data.

Figure 3:
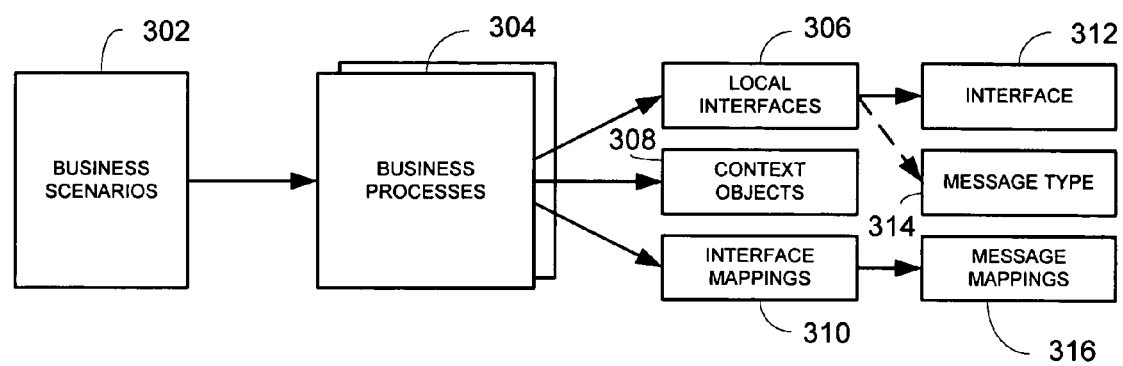
FIG. 3 is a runtime view of the integration repository in which context objects are stored.

FIG. 3 is a diagrammatical view of the repository 300 showing links from the business scenarios 302 to the business processes 304, and various outbound links. The outbound links include references to local interfaces 306, references to context objects 308 and references to interface mappings 310. The local interfaces 306 can reference interfaces 312 and message types 314. The interface mappings 310 references message mappings 316.

The context objects 308 can be used to access payload information via name (e.g. 'Plant'). Data may not be written to context objects 308. Interface mappings 310 are addressed by a process within a transformation step.

In one exemplary situation, when the routing configuration is retrieved from the integration directory, the process name and the outbound interface are the sender information within the message. The message is submitted to the pipeline where the suitable routing relations are evaluated to determine target interface(s) and receiver(s). Context objects are used to distinguish from among different send steps on the same interface 306 or 308. When receivers are specified directly by process definition, the receiver (i.e. business system) may be entered directly or calculated by the receiver determination step. In this case, the pipeline must not calculate the receivers again upon the routing configuration.

If the routing configuration (directory) is used, context objects 308 are used to distinguish send steps that send messages of the same interface from different places in the process. In this manner, the send steps are each located in an exclusive branch of a switch element and need to be sent to different receivers. Without context information provided by context objects 308, it may not be possible to distinguish the send steps from each other because they are part of the same process and are being sent on the same interface. Routing can only use the process name and interface name. Context objects enable submission of additional context information via a send step to the routing. This information can be used in a routing condition and classify the routing relation true or false.

Although a few embodiments have been described in detail above, other modifications are possible. Other embodiments may be within the scope of the following claims.

The invention claimed is:

1. A computer-implemented method of accessing content of a message, comprising:
    defining a context object for inclusion in a message, wherein the context object is an abstraction of content of the message, wherein the context object is defined in a repository, wherein the context object includes a name and a namespace, wherein the name of the context object is used to access payload information and the context object further provides context information to enable send steps that send messages of the same interface from different places in a process to be distinguished;
    assigning the context object to one or more interfaces through which the message is to be communicated, the context object used to select a send process for the message sent to at least one of the assigned interfaces; and
    accessing, via the context object, the content of the message at one of the interfaces.

2. A method in accordance with claim 1, further comprising storing the context object in a repository accessible by a runtime engine to communicate with the one or more interfaces.

3. A method in accordance with claim 2, wherein storing the context object includes storing the name and the namespace associated with the context object.

4. A computer-implemented method of accessing content of a message, comprising:
    defining a context object for inclusion in a message, wherein the context object is an abstraction of content of the message, wherein the context object is stored in a repository and includes criteria to enable reuse across one or more interfaces, wherein the context object provides the criteria for determining one or more send steps at one of the interfaces the context object including a name and a namespace, wherein the name of the context object is used to access payload information, and the context object is further being used to differentiate send steps that a part of the same process that are being sent on the same interface;

assigning, to the one or more interfaces through which the message is to be communicated, the context object describing the message, the context object used to select a send process for the message sent to at least one of the assigned interfaces; and accessing, via the context object, the content of the message at one of the interfaces, wherein accessing the content includes accessing application data associated with the context object.

5. A system for exchanging messages, comprising:

a computer: and a memory including a computer program code configured to provide:

one or more message interfaces, through which messages are received from a sender or sent to one or more receivers: and a repository storing a plurality of context objects for inclusion in a message, wherein each context object is an abstraction of content of the message, and wherein each context object is assigned to at least one of the one or more interfaces to facilitate access to content of the messages communicated through the message interfaces, each context object is further used to select a send process for the messages sent through the message interfaces, wherein the context object includes a name and a namespace, wherein the name of the context object is used to access payload information, and the context object further provides context information to enable send steps that send messages of the same interface from different places in a process to be distinguished.

6. A system in accordance with claim 5, further comprising a directory that stores a plurality of routing rules for routing messages between a sender and one or more receivers through one or more message interfaces.

7. A system in accordance with claim 6, wherein the context objects are assigned to the one or more interfaces according to one or more business processes stored in the directory.

8. A system in accordance with claim 7, further comprising an integration server for executing the one or more business processes.

9. A computer program product containing instructions to configure a computer to perform a method, the method comprising:

defining a context object for inclusion in a message, wherein the context object is an abstraction of content of the message, wherein the context object is stored in a repository, wherein the context object includes a name and a namespace, the name of the context object used to access payload information and the context object further provides context information to enable send steps that send messages of the same interface from different places in a process to be distinguished;

assigning the context object to one or more interfaces through which the message is to be communicated; and accessing, via the context object, the content of the message at one of the interfaces, the context object used to select a send process for the message sent to at least one of the assigned interfaces.

10. A computer program product in accordance with claim 9, wherein accessing the content includes accessing application data associated with the context object.

11. A computer program product in accordance with claim 9, further comprising storing the context object in a repository accessible by a runtime engine to communicate with the one or more interfaces.

* * * * *